United States Patent [19]

Anthony et al.

[11] Patent Number: 4,885,680

[45] Date of Patent: Dec. 5, 1989

[54] METHOD AND APPARATUS FOR EFFICIENTLY HANDLING TEMPORARILY CACHEABLE DATA

[75] Inventors: John H. Anthony, Danbury, Conn.; William C. Brantley, Jr., Mount Kisco, N.Y.; Kevin P. McAuliffe, Yorktown Heights, N.Y.; Vern A. Norton, Croton-on-Hudson, N.Y.; Gregory F. Pfister, Yorktown Heights, N.Y.

[73] Assignee: International Business Machines Corporation, Armonk, N.Y.

[21] Appl. No.: 890,428

[22] Filed: Jul. 25, 1986

[51] Int. Cl.⁴ .................................... G06F 13/00
[52] U.S. Cl. ..................... 364/200; 364/243.41; 364/246.3
[58] Field of Search ... 364/200 MS File, 900 MS File, 364/300

[56] References Cited

U.S. PATENT DOCUMENTS

| | | | |
|---|---|---|---|
| 3,840,628 | 10/1974 | Ready | 364/200 |
| 3,845,474 | 10/1974 | Lange et al. | 364/200 |
| 3,979,726 | 9/1976 | Lange et al. | 364/200 |
| 4,173,781 | 11/1979 | Cencier | 364/200 |
| 4,257,097 | 3/1981 | Moran | 364/200 |
| 4,445,191 | 4/1984 | York | 364/900 |
| 4,513,367 | 4/1985 | Chan et al. | 364/200 |
| 4,574,346 | 3/1986 | Hartung | 364/200 |
| 4,581,702 | 4/1986 | Saroka et al. | 364/200 |
| 4,622,631 | 11/1986 | Frank et al. | 364/200 |
| 4,654,819 | 3/1987 | Stiffler et al. | 364/200 X |

OTHER PUBLICATIONS

"Tightly Coupled Multiprocessor System Speeds Memory-Access Times," appearing in Electronics, Jan. 12, 1984, pp. 164–169, by Steven J. Frank.

"Effects of Cache Coherency in Multiprocessors", IEEE Transactions on Computers, vol. C-31, No. 11, Nov. 1982, by Dubois et al., pp. 1083–1098.

"Cache Memories" by Alan Jay Smith, Computing Surveys, vol. 14, No. 3, Sep. 1982; pp. 473–477 and 504–507.

Primary Examiner—Gareth D. Shaw
Assistant Examiner—Paul Kulik
Attorney, Agent, or Firm—Roy R. Schlemmer, Jr.

[57] ABSTRACT

A method and apparatus for marking data that is temporarily cacheable to facilitate the efficient management of said data. A bit in the segment and/or page descriptor of the data called the marked data bit (MDB) is generated by the compiler and included in a request for data from memory by the processor in the form of a memory address and will be stored in the cache directory at a location related to the particular line of data involved. The bit is passed to the cache together with the associated real address after address translation (in the case of a real cache). when the cache controls load the address of the data in the directory it is also stored the marked data bit (MDB) in the directory with the address. When the cacheability of the temporarily cacheable data changes from cacheable to non-cacheable, a single instruction is issued to cause the cache to invalidate all marked data. When an "invalidate marked data" instruction is received, the cache controls sweep through the entire cache directory and invalidate any cache line which has the "marked data bit" set in a single pass. An extension of the invention involves using a multi-bit field rather than a single bit to provide a more versatile control of the temporary cacheability of data.

18 Claims, 6 Drawing Sheets

FIG.5

| PAGE TABLE ORIGIN s' | PROTECTION BITS | CACHEABLE BIT | MARKED DATA |

SEGMENT TABLE DESCRIPTOR

FIG.6

| REAL ADDRESS p' | PROTECTION BITS | CACHEABLE BIT | MARKED DATA |

PAGE TABLE DESCRIPTOR

FIG.7

| VALID BIT | SEGMENT and PAGE INDEX s,p | CACHEABLE BIT | MARKED DATA BIT | REAL ADDRESS p' |

TLB ENTRY

FIG.8

| VALID BIT | ADDRESS TAG | MARKED DATA BIT |

CACHE DIRECTORY ENTRY

METHOD AND APPARATUS FOR EFFICIENTLY HANDLING TEMPORARILY CACHEABLE DATA

FIELD OF THE INVENTION

The present invention relates to large hierarchical data storage systems and more particularly to such storage systems employing dynamic address generation or virtual memory addressing features and having high speed cache memories associated therewith.

DESCRIPTION OF THE PRIOR ART

Virtual addressing mechanisms for use with large hierarchical memories including high speed caches are well known in the computing arts. The following are representative of the prior art and constitute the most relevant art known to the inventors.

U.S. Pat. Nos. 3,581,291, 3,735,360, and 4,394,731 show a multiprocessor system with a plurality of processors sharing main storage. Associated with each processor is a cache memory. Cache coherence in the sytem is maintained by hardware, i.e. by cache cross-interrogations. Patents 3,735,360 and 4,394,731 use special bits in the cache directories to reduce the amount of cross-interrogation that must occur, thus increasing system performance.

These patents differs from the present invention in that they describe systems using hardware coherence checks, i.e coherence by cache cross-interrogation. Control bits in the cache directories are necessary to ensure coherence and to improve performance by reducing the number of cross-interrogates. The present invention describes a system using software coherence checks and a tecnique to improve performance in such a system.

U.S. Pat. No. 4,442,487 shows a multiprocessor system with a plurality of processors and a three-level memory hierarchy. The memory hierarchy is comprised as follows: level three is shared main storage; level two is comprised of a private cache associated with each processor and a share cache, accessible by all processors; level one is comprised of a private cache associated with each processor and a shared cache accessible by all processors. Two bits are added to pages tables to indicate which cache, private or shared, data can reside. Cache coherence is maintained by cross-interrogation.

This patent describes a memory hierarchy that uses hardware coherence checks. Although the invention does use bits in the page tables to indicate in which cache (private or shared) data can reside, the function of these bits is to reduce the number of cross-interrogates necessary in provide coherence by hardware.

U.S. Pat. No. 4,197,580 describes a processor cache system in which the processor can issue special reads and write that will invalidate the data after the data has been returned to the processor, the the case of a read, or written to memory in the case of a write. The cache directory contains no special accessibility information, nor is the system for multiprocessor use.

U.S. Pat. No. 4,121,286 describe a technique for managing the allocation of tables in memory and determining when these table can be de-allocated. This patent is different from the present invention in that it does not address the issues of maintaining cache coherence or related issues.

U.S. Pat. No. 3,845,474 describes an apparatus for invalidating the entries in a cache. The clearing apparatus can be used in a uniprocessor system or a multiprocessor system. This patent differs from the present invention in that it does not address the problem of handling certain data in the cache as special data and marking the said data so it can be treated specially at some designated time.

The following two articles co-authored by several of the present inventors generally describe the attributes of an experimental high speed multiprocessor computing system having a large shared memory. The first, is tutorial in nature, and describes a system in which the present invention has particular utility. The second article describes a memory element for such a system and generally broadly describes the concepts of the present invention in terms of a "volatile data bit". Both of these articles provide valuable background information for the present invention.

1. Pfister, G. F. Brantley, W. C. George, D. A., Harvey, S. L. Kleinfelder, W. J. McAuliffe, K. P., Melton, E. A., Norton, V. A. and Weiss J. "The IBM Research Parallel Processor Prototype (RP3): Introduction and Architecture," Proc of 1985 International Conference on Parallel Processing, Aug. 20–23, 1985. Pages 764–771.

2. McAuliffe, K. P., Brantley, W. C., and Weiss, J., "The RP3 Processor/Memory Element," Proc. of the 1985 International Conference on Parallel Processing., Aug. 20–23, 1985. Pages 782–789.

SUMMARY AND OBJECTS

The primary object of the present invention is to provide a method and apparatus for marking data stored in a cache memory as being temporarily cacheable.

It is a further object of the present invention to provide such a hierarchical memory system for use with a computing system for improved system performance as the result of reduced memory latency and improved coherence of data.

It is a further object to povide such a method and apparatus which allows all lines in the cache so marked to be invalidated very easily.

It is yet another object of the present invention to provide such a method and apparatus having particular utility in a large multiprocessor computing system having a hierarchical memory configuration including high speed caches.

It is another object of the invention to provide such a method and apparatus wherein the compilation process or programmer provides an indication that data is temporarily cacheable and means are provided for storing such information in both the translation Look-aside buffers and in the cache directory.

It is another object of the present invention to provide such a method and apparatus wherein the indication of temporary cacheability is stored in both the cache directory and the translator Look-aside buffers in case of a read cache memory architecture.

It is a further object of the present invention to provide such a method and apparatus wherein a temporary cacheability vector is generated as a multi-bit field, and means are provided whereby the invalidation of various lines in the cache may be performed as a function of the cacheability vector including "equal"; "greater than"; "less than".

It is a further object of the present invention to provide such a method and apparatus wherein the system provides a multi-bit temporary cacheability vector K- bits long for each cache entry and wherein appropriately marked cache lines may be invalidated which have a pre-determined pattern as specified by a K-bit mask.

It is yet another object of the invention to provide such a method and apparatus wherein the indication of the cacheability may be set as a function of a complete segment or page in the set of virtual addresses.

The objects of the present invention are accomplished in general by a computing system having a hierarchical memory organization including a high speed cache and preferably incorporating virtual addressing capabilities. The system includes a method and apparatus for placing a special bit field together with a line of data in the cache which indicates temporary cacheability of the data which provides improved system performance. This special bit (s) field called a "marked data bit" (MDB) herein is stored in the cache directory relating to the particular line data involved. The bit is passed to the cache with the associated address after address translation. During cache "miss" processing, when the cache controls load the address of the data in the directory, it also stores the marked data bit in the directory together with the address.

When the cacheability of the temporarily cacheable data changes from cacheable to non-cacheable, a single instruction is issued to cause the cache to invalidate all marked data. Means are included in the cache controls responsive to receiving the "invalidate marked data" instruction, for sweeping through the entire cache directory once to invalidate any cache line that has the "marked data bit set" to a specified configuration. An extension of the invention involves using a multi-bit field rather than a single bit to provide more versatile control of the temporary cacheability of data.

The invention has particular utility in a large multi-processor system including a shared memory wherein each processor has its own local cache and further including dynamic address translation facilities.

BRIEF DESCRIPTION OF THE DRAWINGS

FIGS. 5 and 6 illustrate the contents of the segement map table and page frame map tables of FIG. 4, and more specifically they illustrate how the present invention is incorporated in the dynamic address translation phase of the overall memory management function.

FIGS. 7 and 8 comprise diagrams illustrating the contents of a particular translation Look-aside Buffer (TLB) entry for a particular virtual address and the contents of the cache directory at a particular address location therein, both figures also illustrating the existence of the marked data bit field within both of these system components.

DESCRIPTION OF THE PREFERRED EMBODIMENT

Figure 1:
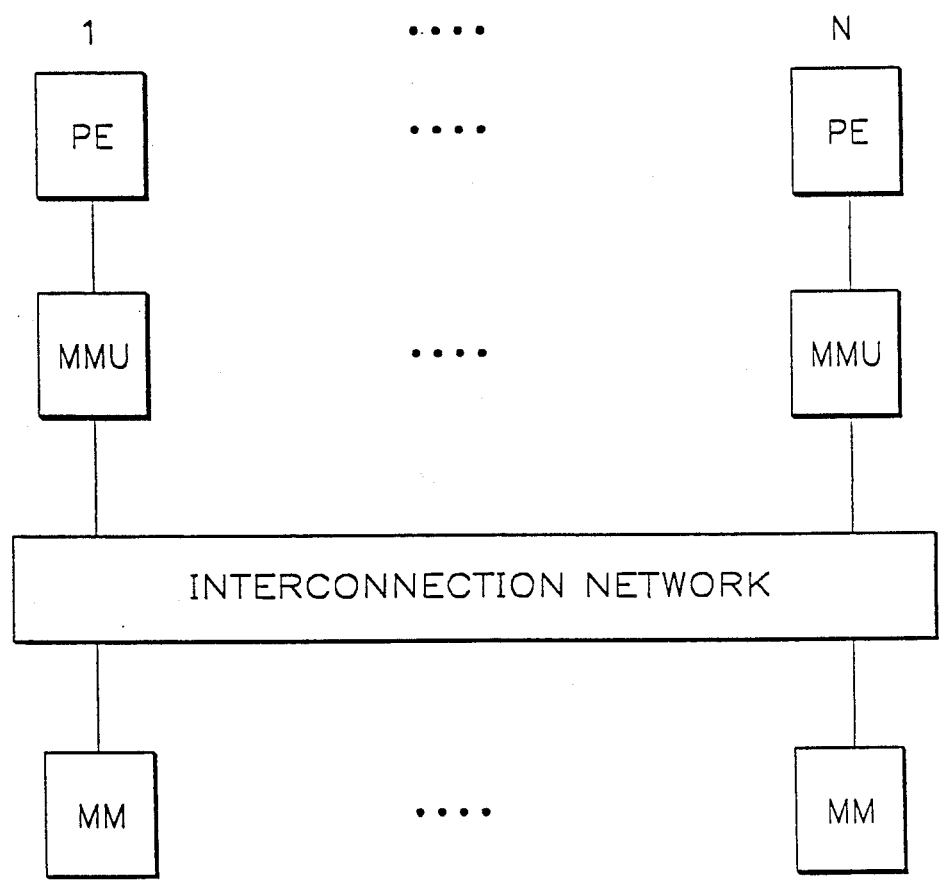
FIG. 1 comprises an organizational drawing of a large state of the art multiprocessor system including a large shared main memory.

Before proceeding with the present description, the following list of definitions of certain data processing terms, as used in the subsequent description, is presented to avoid any possible ambiguity.

DYNAMIC ADDRESS TRANSLATION

The process of mapping a virtual address emitted from a processor to a physical memory address (real address).

There are three common types of translations: segmented, paged, and segmented-and-paged.

PHYSICAL ADDRESS (REAL ADDRESS)

The actual location of data in a physical memory system. The physical address can be partitioned into two pieces, one directly specifying a memory module and the other specifying an offset in that memory.

VIRTUAL ADDRESS

An address emitted by a processor which must undergo mapping to obtain a physical address. For segmented address translation, a virtual address is composed of one part containing the segment number and another part containing an offset in the segment. For segmented-and-paged address translation, a virtual address is composed of one part containing the segment number, a second part containing the page number, and another part containing an offset in the page. For paged address translation, a virtual address is composed of one part containing the page number and a second part containing the offset in the page.

PAGE

A fixed sized section of the virtual address space, usually a power of two in size.

SEGMENT

A variable sized section of the virtual address space, usually having a maximum size which is a power of two. In a segmented-and-paged address translation, segments are composed of a variable number of pages.

PAGE TABLE

A table containing the mapping of a page number to the physical memory address of the origin of the page.

SEGMENT TABLE

A table containing the mapping of a segment number to the physical memory address of the origin of the segment. Or if a segment is comprised of pages, then the segment table contains the mapping of a segment number to the beginning of a page table.

SEGMENT TABLE DESCRIPTOR, STD

One entry of a segment table which describes information about one segment of the virtual address space. This information includes the page table origin (address of the page table of the pages in this segment) and protection information. FIG. 5 shows a STD which also includes Cacheable and Marked Data Bits.

PAGE TABLE DESCRIPTOR, PTD

One entry of a page table which describes information about one page of the virtual address space. This information includes the real address of origin of the page and protection information. FIG. 6 shows a PTD which also includes Cacheable and Marked Data Bits.

TRANSLATION LOOK-ASIDE BUFFER, TLB

Is a table (usually associative) of the most recently performed address translations. A TLB greatly improves performance since translations are needed frequently (every memory reference) and are expensive if done without a TLB (both STD and PTD are needed and arithmetic must be done). When a translation is in a TLB, the translation can be done again cheaply since the accesses of the STD and PTD as well as the arithmetic are eliminated.

CACHE

A memory usually small, high speed, and close to a processor—which contains a subset of the data from the primary memory of the computer. The subset of data kept in the cache usually approximates the data which the processor has most recently referenced. The cache is composed of a cache directory array, a cache data array, and control logic.

The cache data array is a random access memory which contains the copies of the subset of the data from the computer's memory which is currently in the cache. The cache data array is commonly divided into sections of equal size (a power of two number in size) called cache lines. The cache directory array contains the information necessary to decide whether there is a copy of a byte of memory in the cache and in which line that byte is located. There is one record in the cache directory array for each line in the cache data array. A cache line, depending upon the context, refers to either a line in the cache data array, the part of the cache directory array which controls a single line in the cache data array, or both.

Caches differ in their memory update policy, placement algorithm, selection algorithm, and replacement algorithm.

A survey of cache organizations can be found in an article by A. J. Smith entitled "Cache Memories" appearing in *Computing Surveys*, volume 14, number 3, Sept. 1982 on pages 473–530.

CACHE MEMORY UPDATE POLICY

Changes made by the processor to data in the cache must be reflected in the primary memory at some point. The memory update policy determines when this is done. Two memory update policies are common: write-through through where each store made by the processor immediately updates both the cache and the computer's memory; and write-back or store-in where a store made by the processor only updates the cache immediately (the computer's memory is updated only when the cache line containing the data is evicted from the cache to make room for another line).

CACHE PLACEMENT ALGORITHM

The technique used to identify the cache lines in which a byte from memory can appear. Some cache placement algorithms employed include: direct mapping where a byte from memory can appear in exactly one line and this selection is based on a simple function of the memory address; fully associative mapping where a byte can appear in any line; and set associative mapping where a byte can appear in one of a few (usually a power of two) lines. A set associative mapping of a memory address directly maps the address to a small set of cache lines one of which is then selected based on the line selection algorithm. Possible line selection algorithms include random and least recently used.

CACHE REPLACEMENT ALGORITHM

The technique used to select which cache line to evict when all lines, or all lines in a set, are occupied and a new line must be brought into the cache to satisfy a cache miss. A cache miss occurs when the processor references data which is not in the cache.

The present invention describes a method that facilitates the efficient use of cache memories in multiprocessor systems composed of large numbers of processing elements. The method differs from previous methods and techniques in that it makes possible the caching of shared writeable data without cross-interrogation or repetitive cache operations initiated by a processor. By using the cache more efficiently greater system performance can be obtained.

FIG. 1 shows the general organization of a typical state of the art multiprocessor system. The system comprises a plurality of processor elements (PEs) and memory modules (MMs) interconnected via a network. Each processing element has an associated memory management unit (MMU). During normal functioning of a multiprocessor system, the processors emit read or write requests to the memory system. These requests are converted by the MMUs into messages, which travel across the network to the appropriate memory module. At the memory module, such a request is serviced; either the memory location is updated (e.g., write requests) or the contents of the memory location are read (e.g. read requests) and transmitted back to the originating PE.

One limitation on the performance of such a multiprocessing system is the memory request and the return to that PE of the reply to that request. With a system such as that shown in FIG. 1, the memory access time includes the time required for the request message to traverse the network. The time for messages to traverse the network may be quite large because memory references may be delayed by other references traversing the same path.

Figure 2:
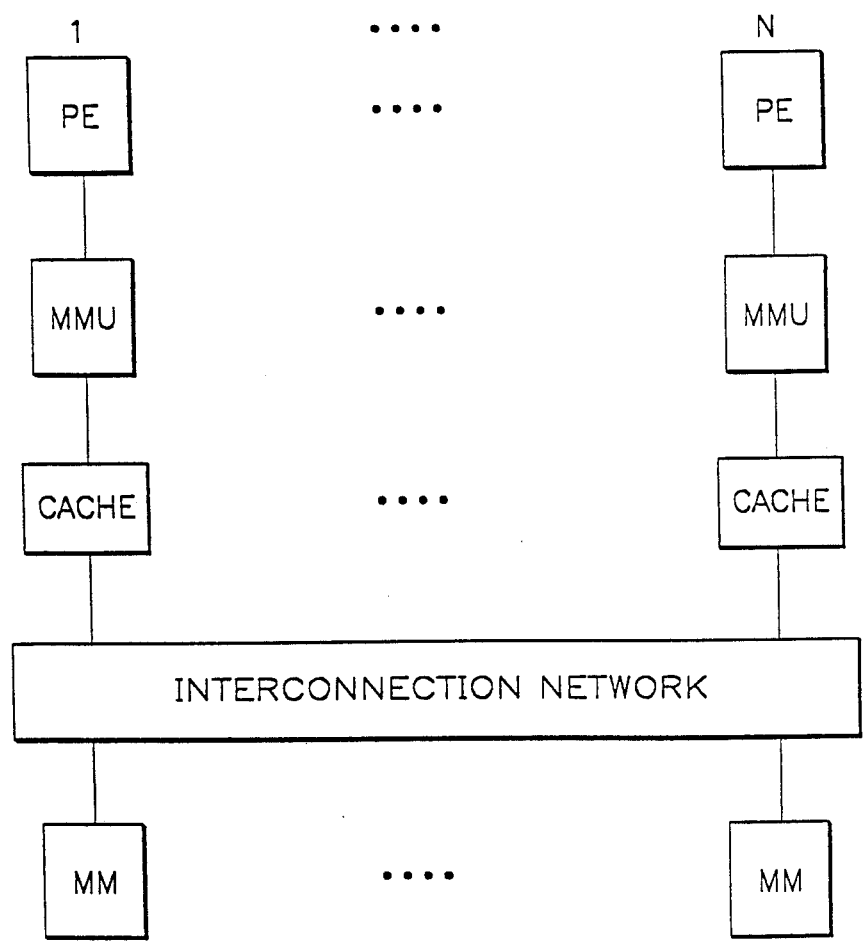
FIG. 2 is an organizational drawing similar to FIG. 1 of such a multiprocessing system having a large shared memory and wherein each processing element (PE) includes a real cache and a virtual addressing capability.

Cache memories (or hierarchical memory systems) are a standard means of reducing the average memory access time (latency) and the frequency of access to the primary memory modules (MMs). FIG. 2 shows such a system. The hierarchy contains caches associated with the processing elements. Data frequently accessed by a given PE is retained in its cache, so that memory references by the processor need not result in time-consuming messages across the network. When a processor issues a memory reference, the referenced address is first compared with the contents of the local cache. If the cache contains the datum referenced, the read or write can be issued to the cache. In the case of a write operation, a message is issued to memory, when the message is issued depends on the update policy.

In order to successfully employ a memory hierarchy, it is necessary to enforce a notion of memory coherence. Multiple values of a given datum may be stored in different cache memories of the system. Consistency dictates that at any given time these values be the same. A memory coherence violation is said to exist whenever two different caches contain different values for the same memory location.

There are two general approaches to maintaining memory coherence: run-time coherence checks and compile-time coherence checks. Run-time coherence checking has been employed in several cache cross-interrogation (XI) architectures. Such systems employ hardware mechanisms to ensure consistency across the various caches: When a store is issued to one cache, the hardware ensures that no other cache contains a datum inconsistent with the value stored.

While cross-interrogation (XI) schemes have been successfully employed in two- and four-way multiprocessor systems, there is reason to believe that XI is not a suitable solution in highly parallel systems employing hundreds or thousands of processors. Each store in such a system can necessitate checking the contents of all caches, so that the cost of cross-interrogation can overwhelm the advantages of cache memory.

This invention applies to compile-time coherence checking. Compile-time coherence checks rely on some data being non-cacheable, or ineligible to be retained in cache. When a datum is non-cacheable, its value can only be read from primary memory (not from cache) and its value can only be changed by modifying the primary memory location containing it (not modifying cache contents). Whether a datum may or may not be cached will be called its cacheability.

Compile-time coherence operates by determining the cacheability of each datum during the creation of the program. This determination of cacheability may be automatic, e.g., determined in some way by the compiler itself or some other program; or it may be non-automatic, e.g., determined by the programmer who then informs the compiler using suitable programming language constructs; or it can be a mixture of the two, e.g., the programmer provides assertions which the compiler uses to determine cacheability.

Compile-time determination of cacheability does not necessarily imply that a datum's cacheability is constant at run time, since the cacheability of data can be different in different program sections. As program execution moves between those sections, the cacheability may change accordingly. For example, a table may be constructed during one section of a computation, and because it is being constructed (modified) it may be considered non-cacheable to maintain coherence; but in other sections of the program the table may only be read, not modified, and hence can be cached without loss of coherence. It should be noted that the present invention provides a method and apparatus for using the marked data bit (MDB) cacheability information not the approaches used in the compiler for determining same. These approaches are subtle and complicated and to try to describe same herein would merely obfuscate the present invention.

Since compile-time checks provide flexibility and have no inherent serial bottlenecks, compile-time coherence checks are well suited for multiprocessor systems consisting of large numbers of PEs. Since software is maintaining coherence, it is the responsibility of the compiler (or programmer) to determine cacheability and to generate special instructions to control the cache.

One strategy for compile-time coherence is as follows: During compilation a datum is classified into one of the following classes: cacheable, temporarily cacheable, or non-cacheable. A datum is cacheable if it is read-only or it is read and modified by at most one processor. A temporarily cacheable datum is modified by several processors, but during a defined portion of a program is accessed like a cacheable datum (i.e. read-only or read and written by at most one process). More than one class of temporarily cacheable data may exist, since different data may be cacheable in different sections of the program. A non-cacheable datum is one that is not cacheable or temporarily cacheable.

To represent the cacheability attributes of data during run time, the virtual address space is divided into classes corresponding to the cacheability classes. Then, as part of storage allocation, data of a given class is allocated in an appropriate class of virtual memory. Thus the address range may be interpreted to determine the cacheability class.

The compiler also must determine when a given temporarily cacheable datum is cacheable and when it is not. At the points where a datum's class changes, the compiler must generate code to ensure that the characteristics of the virtual memory are correct, e.g., ensuring that the segment and/or page descriptors are modified to reflect the cacheable status. To change the cacheability attribute of data from cacheable to noncacheable the compiler must also ensure that the data is evicted from cache by generating special cache control instructions. Data in the cache may either be written back to memory, simply invalidated, or otherwise, depending on the cache update policy. If a store-in cache is used, typical operations are copy-back, invalidate, and copy-back-and-invalidate.

In the prior art these instructions (whether for store-thru or store-in) are usually implemented by specifying an address range over which the instruction is to be applied. The cache performs a single sweep through its directory and applies the instruction to all cache lines within the range. The size of the address range is dependent on the placement of the cache with respect to address translation: The cache can either contain virtual or real addresses. If a virtual cache is used, the range can be any consecutive bytes. If a real cache is used, the largest range is a page (assuming a segment/page virtual to real address translation is used). If the data that must be evicted is in several discontinuous segments or pages then multiple invalidates must be issued, one for each segment/page.

As stated previously the present invention facilitates the Caching of temporarily cacheable data in an efficient manner by marking the said data and retaining the said mark in the memory mapping descriptors, in the memory mapping unit's Translation Look-aside Buffer (TLB), and in the cache. The invention is an improvement over the prior art since it substantially reduces the over head in the management of temporarily cacheable data, by requiring only a single "invalidate marked data" instruction to invalidate all marked data in the cache independent of segment and/or page boundaries.

For the preferred emobidment of this invention a multiprocessor with a configuration as shown in FIG. 2 is assumed. The N autonomous PEs can concurrently issue read and write requests to the memory. The memory addresses issued by the PEs are virtual address. The addresses are translated into real or physical addresses by the MMU. It should be noted that the term "real"

and "physical" addresses may be used interchangeably. The MMU performs the translation process using an internal table call a translation look-aside buffer (TLB). Associated with each of the PEs is a cache. The cache receives that translated address issued by the PEs (i.e. the read addresses). The cache uses the real address to determine if a cache hit or miss has occurred. The update policy for the cache is assumed to be store-through for purposes of describing the present invention.

A two level memory mapping is assumed for the disclosed preferred embodiment. The two levels consisting of segments and pages; thus, virtual addresses are organized into segments and each segment is composed of one or more pages.

The utility of the invention would reside in large high speed multiprocessor systems having large memory systems wherein dynamic address translation or virtual addressing capabilities are provied. This is due to the fact that with such systems, many large segments of temporarily cacheable data may reside in an individual processor's cache which is related to a limited virtual address space at any given time. Subsequently another job or another portion of the same task may be encountered on another processor requiring one or more of the segments whereby these segements of the temporarily cacheable data (residing in cache) would change status.

Dynamic address translation is quite well known in the art per se, and may be found in a number of references including "An Introduction to Operating Systems" by Harvey M. Deitel; Addison-Wesley, New York, N.Y. 1984.

Figure 4:
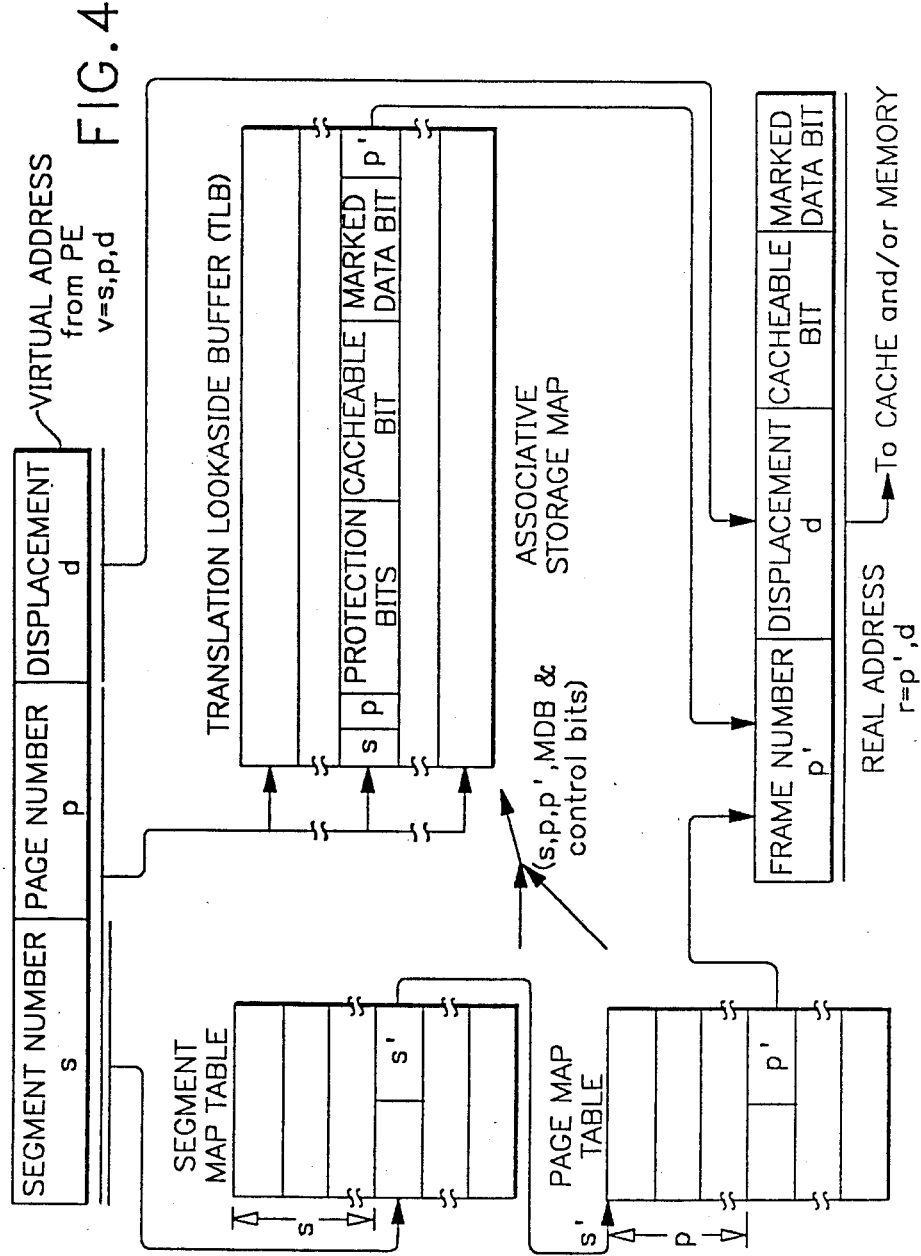
FIG. 4 comprises a set of diagrams illustrative of a typical dynamic address translation process implemented by a memory management unit, detailing how the marked data field of the present invention is passed from the segment and page frame tables in memory where it is loaded after compilation and is retained together with translated real address and the special purpose control bits in the Translation Look-aside Buffer (TLB).

The following is a brief overview description which together with FIG. 4, illustrates how a typical dynamic address translation system works, it being noted that this description should be viewed together with FIGS. 5, 6, and 7 which shows how the temporarily cacheable data or MDB field is stored in the segment table descriptor, page table descriptor, and TLB entry. By carrying the MDB and cacheable bits in the segment table descriptor and the page table descriptor, the MDB may be ultimately stored in the TLB in a manner that provides flexibility in the way temporarily cacheable data is treated.

Referring now to FIG. 4, the brief description of a typical dynamic address translation system will follow, it being understood that many levels of sophistication are possible with such systems including complex segment mapping etc. which may be found in a great number of publications available on the subject, the reference being but one of such sources.

FIG. 4 is primarily a flow diagram of the translation process wherein a virtual address v=s, p, d is requested by a processing element and placed in an appropriate address register shown at the top of the figure. The system first attempts to find the virtual address as defined by the segment s and page p portion of the address in the Translation Look-aside Buffer which is an associative storage map such as is well known in the art. If this address is found, the appropriate page number p' is read out as shown at the bottom of the figure in the real address block. As will be understood the protection bit, cacheable bit, and MDB would have been stored in the TLB as may be seen in FIG. 7. In the case of a translation "miss" the system would proceed to memory and access the sth STD in the segment map table, which would cause the appropriate page table origin s' to be read out of the segment map table, and an appropriate page map table (sth) would be accessed from memory to produce the page number p'. The page number p' constitutes the real page number in memory for the virtual address which together with the displacement d constitutes the real address for the line of memory desired. After the translation is done thusly, the real address cacheability and MDB are sent toward memory and the result of the tranlation is saved in the TLB. It will similarly be noted in FIGS. 5 and 6 that the protection bits, cacheable bit, marked data field are carried in the segment map table and page map table. These fields are loaded into the segment map and page map tables at program loading time, after compilation.

Thus to recapitulate briefly, once the virtual address is produced by the processor, the system first tries to translate same utilizing the high speed TLB's and if so directly accesses the real address and if not it must go through the considerably more time consuming route of the accessing and searching through the segment and page mapping tables in memory. It will be noted in the figure that the large arrow pointing upwardly towards the TLB's with the note s, p, p' indicate that when a TLB miss-occurs and the translation is performed via the mapping tables. An appropriate entry is made in the Translation Look-aside Buffer so that the next time an address in this page is to be translated, the appropriate translation will be present (unless it is rejected as a result of an intervening replacement operation as will be understood by those skilled in the art).

As previously described, during compilation, the attribute of each datum with respect to cacheability is determined. A datum will be either: cacheable, temporarily cacheable, or non-cacheable. Also during compilation, the program sections are recorded during which temporarily cacheable data can be cached. The temporary cacheability of data can be determined using techniques similar to those used in the following reference cited therein. A paper by M. Burke and R. Cytron entitled "Interprocedural Dependence Analysis and Parallelization" in the Proceedings of the Sigplan '86 symposium on Compiler Construction, July 1986; pages 162-175. The storage allocator of the compiler organizes the three classes of data into logical segments. The allocator associates two special indicators with each segment: a cacheable bit and a marked data bit. The cacheable bit specifies whether the data can be cached and the marked data bit indicates whether the data is temporarily cacheable. These indicators are passed to the operating system when the program is run, e.g., either by system calls issued from the compiler-generated code; or by storing the indicators in some form in a table referred to by the operating system when it initializes and runs the program.

When the operating system generates the segment and page descriptor for the logical segments generated by the compiler, the operating system sets bits in the segment and page descriptors according to the value of the cacheable bit and temporarily cacheable bit (marked data bit) set by compiler's storage allocator. FIGS. 5 and 6 show the said bits in the segment and page map table descriptors.

During the execution of a process, when a segment/page is loaded into the Memory Mapping Unit (MMU) and stored in the TLB (either by hardware or software control), the cacheable bit and the marked data bit is copied into the TLB entry along with several other entries of the descriptor.

The value to the marked data bit stored into the TLB entry is a boolean function of the segment table descriptor MDB and the page table descriptor MDB. For the preferred embodiment a MDB is set to one to indicate that the data is temporarily cacheable and the boolean function used is an OR. Using hte logical OR function facilitates the marking either of all pages of segment to be marked as temporarily cacheable by simply setting the MDB in the segment table to one of a subset of a segment's pages to be marked as temporarily cacheable by setting the MDB in the segment table descriptor to zero and setting the MDB in the page table descriptors of the subset to one. FIG. 7 shows the said MDB in the TLB entry. During address translation the MMU passes the real address, the cacheable bit, and the marked data bit to the cache. If a cache determines that the physical address is not in its directory and the request is a cacheable request the cache will issue a request for a cache line that contains the requested data.

When the cache allocates space in its data array for the cache line and stores the physical address in its directory array, the cache also stores the marked data bit for that physical address in the directory as well. FIG. 8 shows the said bit in a directory array element. If the marked data bit is set the data in the cache line is temporarily cacheable and considered volatile. The cache can contain many entries that have the marked data bit set. These marked entries can be from any number of segments and/or pages.

When the cacheability of the temporarily cacheable data changes from cacheable to non-cacheable, the temporarily cacheable data must be evicted from the cache. This is accomplished by the PE issuing a single instruction to cause the cache to invalidate all marked data. The cache, upon receiving the instruction to invalidate marked data, invalidates the temporarily cacheable data by zeroing the valid bit in any directory entry that has its mark data bit set. Thus a single instruction and a single sweep through the cache, suffices to invalidate all the temporarily cacheable data, even if that data exists in many non-contiguous units in either the virtual or the real address space. The prior art uses separate instructions, and cache sweeps, for each contiguous unit of virtual (or real) addresses to be invalidated. Because sweeping through the cache may be a very lengthy operation, and this invention reduces multiple sweeps to a single sweep, this invention reduces the invalidation overhead substantially.

Figure 9:
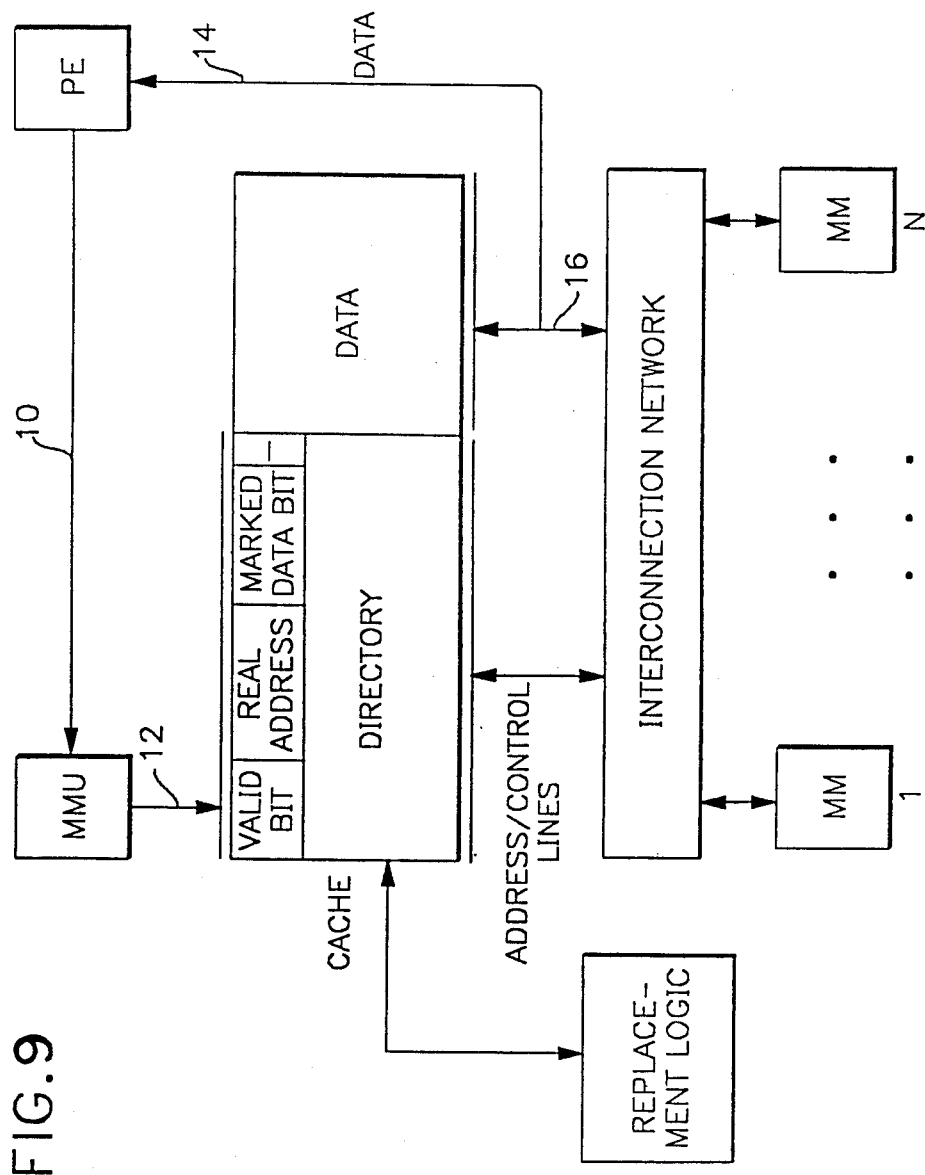
FIG. 9 comprises a high level organizational diagram of the cache and cache controls in a typical system embodying the principles of the present invention.

The FIG. 9 is a detailed diagram showing the address, control and data lines indicating data and address flow between the CPU, MMU, CACHE in the main memory via the Interconnection Network. As may be readily seen it is a more detailed version of the system shown in FIG. 2. As such it assumes that the system is operating in the virtual address mode, in other words virtual addresses are presented by the CPU to the MMU as indicated on the figure. Upon receipt, the MMU translates the virtual address into a real address, then the residency in the cache is determined. If the address is found in the cache directory, the cache will be appropriately accessed and the data can either be read from or written into the cache via cable 14. In the event that the instruction requires a fetch from memory, the data portion of the cache would be loaded from memory via cable 16.

If it is found that the requested real address is not present in the cache directory this will cause a cache "miss" indication which will then initiate replacement logic to be activated and the data will be loaded into the cache at the line indicated by the replacement logic either from memory via cable 16 or from the CPU via cable 14.

The format of the individual lines in the cache directory is shown in the upper left hand portion of the directory which is essentially a repeat of FIG. 8. Thus, each line of the directory having an associated data line in the cache will include a valid bit, a real address, and an MDB field whether this be one bit or a plurality of bits as described herein. One field is shown blank which would be used for other control purposes as will be apreciated by those skilled in the art. It will be remembered at this point, that the real address and the marked data bit field (MDB) are loaded into the cache directory from the MMU where the real address is computed and the marked data bit field was stored subsequent to compilation of the program which of course includes loading of the segment and page mapping tables in memory. If it is desired to invalidate all cache lines having either a single marked data bit set, in the simplest embodiment, or having a particular marked data bit field configuration, a single CPU instruction can accomplish this purpose. In the simplest realization of such a function, the directory would be sequentially searched and all lines having the the MDB bit field set, would be invalidated. Alternatively it would be possible to make the MDB bit field accessible via an associative search, if it were desired to build this feature into the system wherein a single access of the directory memory would cause all cache lines meeting the search criteria to be flagged and their contents invalidated. The significance of the feature however is that only a single invalidate commanad needs to be given by the CPU. All required operations will be carried out automatically.

As stated before, the above description is for a simplified version of the cache operation and relates only to those functions which are relevant to the present invention. Many modifications of the cache architecture could be made to those skilled in the art such as features set forth in the prior art section while still essentially incorporating the herein disclosed invention.

Although the herein described embodiment discloses a plurality of substantially identified PE's having accessibility to a shared memory, it should be clearly understood that the term processing element could apply to any functional unit in such a computing system having a local cache and the ability to address same. Examples of such other functional units would be a vector processing unit or an I/O channel drive.

In a first variant of this invention a bit vector, representing a number called a "level", can be used instead of a single bit to identify the marked data. In this variation several different "levels" of data volatility can be used. This allows several sets of temporarily cacheable data to coexist in the cache.

Each of the sets of temporarily cacheable can then be invalidated independently. Alternatively, an instruction can be defined that invalidates all temporarily cacheable data above (or below) a given "level" number.

In another variant, of this invention a bit vector K bits long, representing K different classes of temporarily cacheable data, can be used instead of a single bit to identify the marked data. This allows several sets of temporarily cacheable data to coexist in the cache. By supplying a bit pattern K bits long to the cache, any subset of the K classes can be invalidated in a single sweep through the cache.

Also, a store-in cache can be used instead of a store-through. In the case of a store-in cache architecture three cache functions on marked data would be desirable: invalidate, copy-back, and copy-back-and-invalidate.

Figure 3:
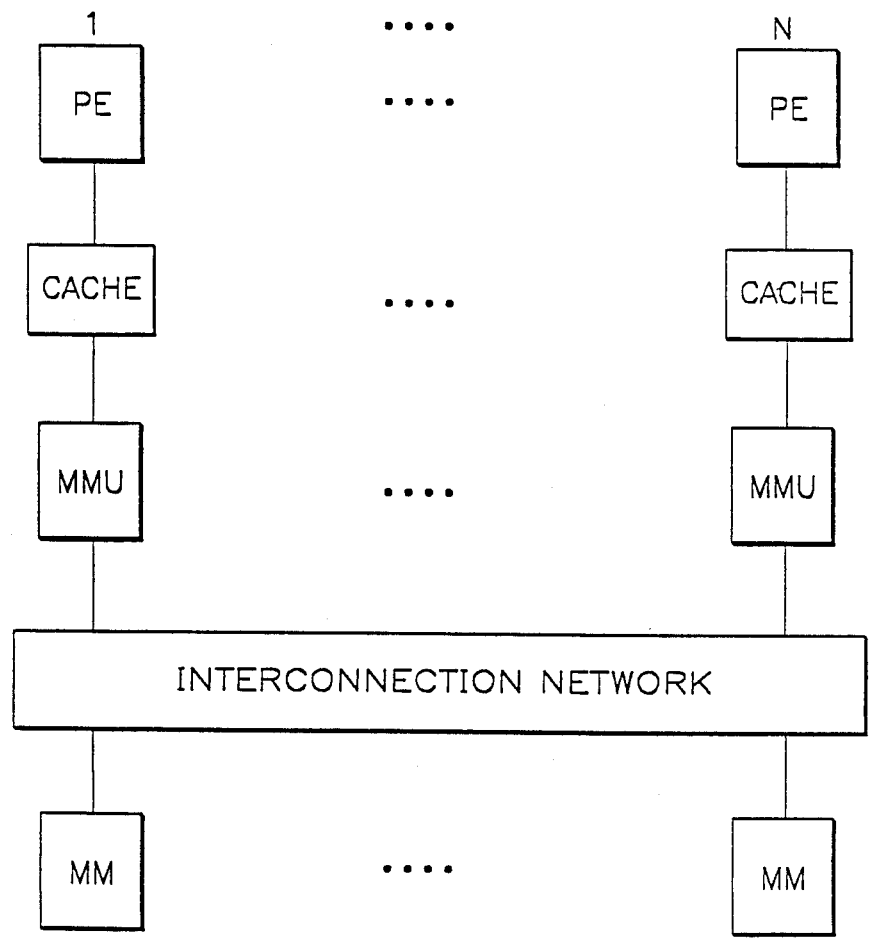
FIG. 3 comprises an organizational drawing similar to FIG. 2 wherein one or more of the caches may be operated in the virtual rather than the real mode.

In still another variant the present invention can be used with a virtual cache. A virtual cache differs from the cache as defined above in that the cache receives virtual address directly from the PE. Address translation by the MMU occurs after the cache. FIG. 3 shows such a multiprocessor system. In this variation the marked data bit functions as above. When a cache miss occurs the MMU passes to the cache the value of the marked data bit for the virtual address that is being accessed. The virtual address and the control bits including the MDB can be loaded into the cache directory at the same time the memory is accessed with the real address. Or the directory can be loaded when the requested data from memory is loaded into the cache.

When the PE needs to invalidate marked data, it issues an invalidate-marked-data instruction, as previously described. The cache will then invalidate all marked data. The cache can be either a store-through or store-in cache with appropriate controls and command structure as will be readily appreciated by those skilled in the art.

Another variant of the invention permits the marked data bit to be set only on a page basis. This allows its use in systems that either only support memory mapping on a page level; or does not need the additional flexibility provided by both segment and page marking. In this variant the value of the marked data bit in the page table descriptor is copied into the TLB during TLB "miss" processing.

Another variant of the invention permits the marked data bit to be on a segment basis only. This allows its use in systems that either support only segment memory mapping on a page level; or does not need the additional flexibility provided by both segment and page marking. In this variant the value of the marked data bit in the page table descriptor is copied into the TLB during TLB "miss" processing.

Another variant of the invention permits the marked data bit to be on a segment basis only. This allows its use in systems that either support only segment memory mapping; or do not need the flexibility of both segment and page marking. In this variant the value of the marked data bit in the segment table descriptor is copied into the TLB during TLB "miss" processing.

A still further variant of the invention permits the marked data bit to be on a per word or object basis (rather than on a page basis) when using a tagged memory by including the MDB as a subfield of the tag. (Examples of computers which have tagged memory include the Symbolic 3600 and the Burroughs B6500/B7500). The tag typically contains the type of information held in a memory location. The MDB field of the tag would be set by compiler as it is in the other variants of this invention.

In another variant, the MDB could be a single bit field in the segment table descriptor, the page table descriptor, and the TLB entry, but be a k-bit field in the cache directory entry. In this variant the MDB field in the cache directory would be an invocation count. The cache would maintain a k-bit counter indicating the current invocation of temporarily cacheable data. The temporarily cacheable data in the cache would be considered valid only if the value in the MDB equaled the current invocation count.

When a cache miss occurs, if the virtual address being accessed has its marked data bit set in the TLB, the value of the invocation counter is copied into the MDB field of the cache directory. When the temporarily cacheable data is to be evicted from cache—by a single CPU command—the invocation counter is incremented. Since the counter is one greater than its previous value all marked data in the cache is invalid (since the value in the MDB field would not equal the present invocation count). If the counter wraps-around, the entries in the cache must be invalidated by other means, possibly using one of the technique describe herein.

Various other modifications, substitutions and changes could be readily made in the overall architecture of a system by those skilled in the art without departing from the principles of the present invention as set forth in the claims.

Having thus described our invention, what we claim as new, and desire to secure by Letters Patent is:

1. In a high speed electronic multiprocessor computer system comprising a plurality of separate processing elements (PE), each having associated therewith a high speed cache memory and a large shared main memory accessible to each PE and its, associated cache, and to other PE's and caches in the system, each cache memory including a control mechanism and a cache directory accessible to its local PE said cache directory containing the addresses of all data lines currently stored in the cache memory, said cache memory and main memory being operable under the control of a memory management procedure including a method for managing temporarily cacheable data resident in each cache serving its associated processor in which each processor can invalidate the temporarily cacheable data in its associated cache with a single instruction, said instruction being applied to temporarily cacheable data independently of the ranges of addresses of the temporarily cacheable data, the method comprising associating a marked data bit (MDB) field with a data line of temporarily cacheable data, through the steps of accessing a data line from main memory after a cache miss, concurrently accessing the associated marked data bit (MDB) field which indicates that the data line to which the MDB refers is temporarily cacheable data when the MDB is set to a first binary state, storing said MDB in the cache directory at the line address where the data line referenced by the MDB is stored, and selectively invalidating all lines in the cache having their MDBs set to said first binary state in response to a single invalidate MDB instruction received from the PE which is served by the particular cache memory.

2. A method for managing temporarily cacheable data as set forth in claim 1 including searching through the entire cache directory in response to said invalidate MDB instruction to detect all cache lines having their MDBs set to said first binary state and, setting a valid data field in the cache directory for all detected lines to an invalid status.

3. A method for managing temporarily cacheable data as set forth in claim 2 wherein said memory management facility includes a dynamic address translation facility including both segment and page mapping tables, said method further including accessing an MDB stored in memory in the segment and page mapping tables utilized for performing an address translation function, and setting the MDB field in the cache directory from the MDB data in the mapping tables after a cache miss.

4. A method for managing temporarily cacheable data as set forth in claim 3 wherein a dynamic address translation mechanism associated with each PE includes a high speed translation Look-aside Buffer (TLB) for storing recent address translations of virtual addresses provided by each said PE, said method further including storing the MDB associated with a particular address in the mapping tables in the TLB together with the address translation following the TLB miss.

5. A method for managing temporarily cacheable data as set forth in claim 4 wherein the memory management procedure utilizes a real cache, said method further including means for accessing the MDB from the mapping tables or the TLB associated with a particular virtual address translation and storing said MDB in the cache directory together with the real address corresponding to the virtual address.

6. A method for managing temporarily cacheable data as set forth in claim 5 wherein the temporary cacheability of data is determined during compilation of a particular program, said method including storing the MDB associated with a particular block of data in main memory so that it will be accessed and available to the system whenever a cache miss occurs and said data is transferred to cache and appropriate entries made in the cache directory.

7. A method for managing temporarily cacheable data as set forth in claim 4 wherein the memory management procedure utilizes a virtual cache said method further including means for accessing the MDB from the mapping tables or the TLB associated with a particular virtual address and storing sand MDB in the cache directory together with the real address corresponding to the virtual address.

8. A method for managing temporarily cacheable data as set forth in claim 2 wherein the main memory is a tagged memory in which a tag field is included with data blocks stored in said main memory, said tag field describing functional characteristics of a data block to which it relates and wherein an MDB field is included in the tag field, said method including accessing the MDB field from said main memory which refers to a particular line to be loaded into the cache after a cache miss and storing the MDB field in a location in the cache directory directly related to the location in the cache where the particular line is stored.

9. A method for managing temporarily cacheable data as set forth in claim 5 including setting the MDB in the TLB and the cache directory as a predetermined boolean function of the MDB stored in main memory at the real address of data blocks accessed subsequent to a particular address translation in the segment and page mapping tables.

10. A method for managing temporarily cacheable data as set forth in claim 5 including setting the MDB in the TLB and the cache directory as a direct function of only the MDB stored in the segment mapping Table.

11. A method for managing temporarily cacheable data as set forth in claim 5 including setting the MDB in the TLB and the cache directory as a direct function of only the MDB stored in the page mapping table.

12. A method for managing temporarily cacheable data as set forth in claim 6 wherein the MDB field generated by the compilation procedure comprises K-bits capable of representing a plurality of levels of cacheability, said method further including storing said K-bit MDB field in the mapping tables in memory, the TLB and the cache directory, and performing said data invalidating step by specifying a predetermined value of said K-bit MDB field and searching said directory for lines to be invalidated based on said value.

13. A method for managing temporarily cacheable data as set forth in claim 12 wherein the K-bit MDB field represents a level number, said method further including selectively invalidating marked cache lines which have an MDB field less than, equal to, or greater than a threshold magnitude specified in an invalidate cache lines instruction.

14. A method for managing temporarily cacheable data as set forth in claim 12 including the step of selectively invalidating cache lines specifying that these cache lines to be invalidated must have MDB fields which exactly match a specified portion of an invalidate cache lines mask.

15. A method for managing temporarily cacheable data as set forth in claim 5 wherein a store-in cache architecture is used including the steps of selectively:
   (1) copying the data stored in the cache memory back into main memory,
   (2) copying the data stored in the cache memory back into the main memory and invalidating the cache lines, or
   (3) invalidating the cache lines by specifying a predetermined invalidate cache lines instruction.

16. A method for managing temporarily cacheable data as set forth in claim 5 wherein the MDB field in the Segment and Page mapping tables and the TLB are a single bit but wherein the MDB field in the cache directory is M bits, said method including setting said M-bit field in the cache directory to the current setting of an invocation counter associated with the cache controls whenever a new entry having its MDB set to indicate temporary cacheability is stored in the cache, incrementing said counter when an invalidate cache line instruction is given and, invalidating all cache lines having an MDB count value less than the current setting of the invocation counter.

17. In a high speed electronic multiprocessor computer system comprising a plurality of separate processing elements (PE), each having associated therewith a high speed real cache memory including a control mechanism and a cache directory accessible to its local PE, said cache directory containing the real addresses of all data lines currently stored in the cache memory and a large shared main memory accessible to each PE, its associated cache, and other PE's and caches in the system said system including a dynamic addressing facility including page and segment mapping tables in memory and a translation Look-aside Buffer (TLB) for storing recent address translations of virtual addresses and wherein the fact that data is temporarily cacheable is determined during compilation of a particular program and stored as a marked data bit field (MDB) in the segment and page mapping tables, a method for managing temporarily cacheable data resident in the cache which includes accessing from the segment and page mapping tables in memory or the TLB, the marked data bit (MDB) field, for indicating that a data line to which the MDB refers is temporarily cacheable data, and storing said MDB field in the cache directory when an associated data line is stored in the cache, storing the MDB associated with a particular address in the mapping tables in the TLB together with a translation of the address following a TLB miss, searching through the entire cache directory without regard to the memory address of the data in response to a single invalidate MDB instruction to detect all cache lines having their MDBs set to a predetermined state to indicate temporary cacheability and, setting all detected lines to an invalid status signifying that the data cannot be used.

18. A method for managing temporarily cacheable data as set forth in claim 17 including setting the MDB in the TLB and the cache directory as a boolean function of the MDB stored in main memory at the real address of the data block accessed by a particular address translation in the segment and page mapping tables.

* * * * *